United States Patent
Reichman et al.

(10) Patent No.: US 6,890,419 B2
(45) Date of Patent: May 10, 2005

(54) ELECTROLYTIC PRODUCTION OF HYDROGEN

(75) Inventors: Benjamin Reichman, West Bloomfield, MI (US); William Mays, Commerce Township, Oakland County, MI (US)

(73) Assignee: Ovonic Battery Company, Inc., Rochester Hills, MI (US)

(*) Notice: Subject to any disclaimer, the term of this patent is extended or adjusted under 35 U.S.C. 154(b) by 162 days.

(21) Appl. No.: 10/321,935

(22) Filed: Dec. 17, 2002

(65) Prior Publication Data

US 2003/0089620 A1 May 15, 2003

Related U.S. Application Data

(63) Continuation-in-part of application No. 09/929,940, filed on Aug. 15, 2001, now Pat. No. 6,607,707.

(51) Int. Cl.⁷ .................................. C25B 1/02
(52) U.S. Cl. ....................................... 205/637
(58) Field of Search .......................... 205/637

(56) References Cited

U.S. PATENT DOCUMENTS

| | | | | |
|---|---|---|---|---|
| 4,615,777 A | * | 10/1986 | Miles et al. | 205/637 |
| 4,699,700 A | * | 10/1987 | Dhooge | 205/560 |
| 5,028,307 A | * | 7/1991 | Rightmyer | 204/278 |
| 5,599,640 A | * | 2/1997 | Lee et al. | 429/46 |
| 6,090,266 A | * | 7/2000 | Roychowdhury | 205/637 |
| 6,299,744 B1 | * | 10/2001 | Narayanan et al. | 204/263 |
| 6,368,492 B1 | * | 4/2002 | Narayanan et al. | 205/638 |
| 6,432,284 B1 | * | 8/2002 | Narayanan et al. | 204/263 |
| 6,533,919 B1 | * | 3/2003 | Narayanan et al. | 205/637 |

FOREIGN PATENT DOCUMENTS

JP    62-260085 A  * 11/1987  ............. C25B/1/00

* cited by examiner

*Primary Examiner*—Roy King
*Assistant Examiner*—Harry D. Wilkins, III
(74) *Attorney, Agent, or Firm*—Kevin L. Bray; Marvin S. Siskind

(57) ABSTRACT

Methods for producing hydrogen gas from organic substances. According to the methods, hydrogen is produced from an electrochemical reaction of an organic substance with water or a base. The instant methods permit the production of hydrogen at lower operating voltages or lower operating temperatures relative to water electrolysis. Operable organic substances include alcohols, ethers, carboxylic acids, aldehydes, and ketones. In a preferred embodiment, hydrogen gas is produced from an electrochemical reaction of methanol in the presence of a base such as NaOH or KOH.

30 Claims, 4 Drawing Sheets

ELECTROLYTIC PRODUCTION OF HYDROGEN

CROSS-REFERENCE TO RELATED APPLICATIONS

This application is a continuation-in-part of application Ser. No. 09/929,940, filed Aug. 15, 2001, issued as U.S. Pat. No. 6,607,707 on Aug. 19, 2003, the disclosure of which is herein incorporated by reference.

FIELD OF THE INVENTION

This invention pertains to electrolytic reactions of organic substances to form hydrogen gas. More specifically, this invention pertains to the generation of hydrogen gas through the electrolysis of organic substances in the presence of water, acids and/or bases. Most specifically, this invention pertains to the production of hydrogen gas at or near room temperature through the electrolysis of organic substances in the presence of a base without the co-production of carbon dioxide.

BACKGROUND OF THE INVENTION

Modern societies are critically dependent on energy to maintain their standards of living and economic viabilities. All aspects of modern life, ranging from the generation of electricity to the powering of automobiles, require the consumption of energy. Conventional fossil fuels are primarily used to meet the energy needs of today's societies. As more societies modernize and existing modern societies expand, the consumption of energy continues to increase at ever growing rates. The increased worldwide use of fossil fuels is creating a number of problems. First, fossil fuels are a finite resource and concern is growing that fossil fuels will become fully depleted in the foreseeable future. Scarcity raises the possibility that escalating costs could destabilize economies as well as the likelihood that nations will go to war over the remaining reserves. Second, fossil fuels are highly polluting. The greater combustion of fossil fuels has prompted recognition of global warming and the dangers it poses to the stability of the earth's ecosystem. In addition to greenhouse gases, the combustion of fossil fuels produces soot and other pollutants that are injurious to humans and animals. In order to prevent the increasingly deleterious effects of fossil fuels, new energy sources are needed.

The desired attributes of a new fuel or energy source include low cost, plentiful supply, renewability, safety, and environmental compatibility. Hydrogen is currently the best prospect for these desired attributes and offers the potential to greatly reduce our dependence on conventional fossil fuels. Hydrogen is the most ubiquitous element in the universe and, if realized, offers an inexhaustible fuel source to meet the increasing energy demands of the world. Hydrogen is available from a variety of sources including coal, natural gas, hydrocarbons in general, organic materials, inorganic hydrides and water. These sources are geographically well distributed around the world and accessible to most of the world's population without the need to import. In addition to being plentiful and widely available, hydrogen is also a clean fuel source. Combustion of hydrogen produces water as a by-product. Utilization of hydrogen as a fuel source thus avoids the unwanted generation of the carbon and nitrogen-based greenhouse gases that are responsible for global warming as well as the unwanted production of soot and other carbon-based pollutants in industrial manufacturing. Hydrogen truly is a green energy source.

The realization of hydrogen as a ubiquitous source of energy ultimately depends on its economic feasibility. Economically viable methods for producing hydrogen as well as efficient means for storing, transferring, and consuming hydrogen, are needed. Chemical and electrochemical methods have been proposed for the production of hydrogen. The most readily available chemical feedstocks for hydrogen are organic compounds, primarily hydrocarbons and oxygenated hydrocarbons. Common methods for obtaining hydrogen from hydrocarbons and oxygenated hydrocarbons are dehydrogenation reactions and oxidation reactions.

Dehydrogenation reactions produce hydrogen by transforming saturated hydrocarbons to unsaturated hydrocarbons. Reformation reactions are a common type of oxidation reaction and involve the breaking of bonds between hydrogen and other atoms such as carbon, oxygen or nitrogen. Hydrogen atoms released upon bond breakage combine to form the desired diatomic hydrogen molecules. The broken bonds remaining on the feedstock molecules recombine or reform to produce new molecules. The reformation process is formally an oxidation reaction of the feedstock molecules.

Production of hydrogen from hydrocarbon and oxygenated hydrocarbon feedstocks is frequently accomplished with a steam reformation process. In steam reformation processes, a hydrocarbon or oxygenated hydrocarbon (e.g. methanol) feedstock is contacted with water in a high temperature reactor to produce hydrogen gas ($H_2$) along with carbon monoxide (CO) and/or carbon dioxide ($CO_2$). Representative hydrogen producing steam reformation reactions for a general hydrocarbon ($C_nH_m$) and a general alcohol ($C_pH_qOH$), are given below:

$$C_nH_m + xH_2O \leftrightarrows (m/2+x)H_2 + yCO_2 + (n-y)CO$$

$$C_pH_qOH + rH_2O \leftrightarrows (\tfrac{1}{2}(q+1)+r)H_2 + vCO_2 + (p-v)CO$$

The hydrocarbon $C_nH_m$ can be an alkane, alkene or alkyne and the group $C_pH_q$ on the general alcohol can be an alkyl, alkenyl, or alkynyl group. Similar reactions can be used to describe the production of hydrogen from other oxygenated hydrocarbons such as aldehydes, ketones, and ethers. The relative amounts of $CO_2$ and CO produced depend on the specific reactant molecule, the amount of water used, and the reaction conditions (e.g. temperature and pressure).

Although the prior art steam reformation processes effectively generate hydrogen, they suffer from several drawbacks. First, the reactions are endothermic at room temperature and therefore require heating. Temperatures of a few to several hundred degrees are needed to realize acceptable reaction rates. These temperatures are costly to provide, impose special requirements on the materials used to construct the reactors, and limit the range of applications. Second, the required high temperatures imply that steam reformation reactions occur in the gas phase. This means that hydrogen must be recovered from a mixture of gases through some means of separation. The separation means adds cost and complexity to the reformation process and make it difficult to obtain perfectly pure hydrogen. Finally, the production of $CO_2$ and/or CO is environmentally undesirable since both gases contribute to the greenhouse effect believed to be responsible for global warming.

Electrochemical generation of hydrogen has focused on water electrolysis. In water electrolysis, water is split into hydrogen gas and oxygen gas. Water electrolysis is an extremely attractive process for producing hydrogen because it utilizes water, a readily available and renewal source material, and generates no harmful by-products. Water electrolysis can also be conducted at room temperature, rather than at the high temperatures required for the common, cost-effective chemical feedstocks. Although tremendous effort has been directed at achieving water electrolysis, the method has not been widely used in practice because high expenditures of electrical energy are required to effect water electrolysis. The water electrolysis reaction requires a high minimum voltage to initiate and an even higher voltage to achieve practical rates of hydrogen production. The high voltage leads to high electrical energy costs for the water electrolysis reaction and has inhibited its widespread use.

It is evident that a need exists for producing hydrogen in an efficient, economically feasible, and environmentally friendly way. It is desirable to have a process for producing hydrogen that operates at or near room temperature with minimal energy consumption. It is also desirable to have a process for producing hydrogen that avoids or minimizes the generation of environmentally harmful gases as by-products. Discovery of an acceptable process for producing hydrogen would greatly advance the cause of achieving a clean-burning economy based on hydrogen. Convenient access to hydrogen fuel, coupled to efficient technologies such as fuel cells for extracting energy from hydrogen, offers the potential to greatly reduce our current dependence on fossil fuels.

SUMMARY OF THE INVENTION

There is disclosed herein a process for producing hydrogen gas through the electrolysis of organic substances. The electrolysis process comprises the step of applying a voltage to an solution that includes an oxidizable organic substance. In addition to the organic substance, the electrolyte solution may include water, a base and/or an acid. The applied voltage effects reaction of the organic substance to produce hydrogen gas. In the absence of a base, the organic substance reacts primarily with water in an electrolysis reaction to produce hydrogen gas and carbon dioxide gas as a by-product. In the presence of a base, the organic substance reacts primarily with hydroxide ion to produce hydrogen gas along with bicarbonate ion and/or carbonate ion as by-products. Inclusion of a base provides for hydrogen production without generation of a greenhouse gas and without the need to separate hydrogen from other gas phase products. The electrolytic reaction can be run at room temperature. The hydrogen gas produced in the electrolytic reaction can be delivered to a hydrogen-based energy or storage device such as hydrogen storage alloy or used as a fuel.

A wide variety of organic substances are suitable for the present invention. In a preferred embodiment, the organic substance is more readily oxidized than water. Representative organic substances that produce hydrogen according to the instant invention include hydrocarbons, alcohols, aldehydes, sugars, ketones, carboxylic acids and ethers. Metal hydroxides are the preferred bases. In a particularly preferred embodiment of the present invention, hydrogen gas is produced from the reaction of methanol with potassium hydroxide in aqueous solution in an electrochemical reaction cell that includes Pt/C electrodes.

DETAILED DESCRIPTION OF THE INVENTION

Figure 1:
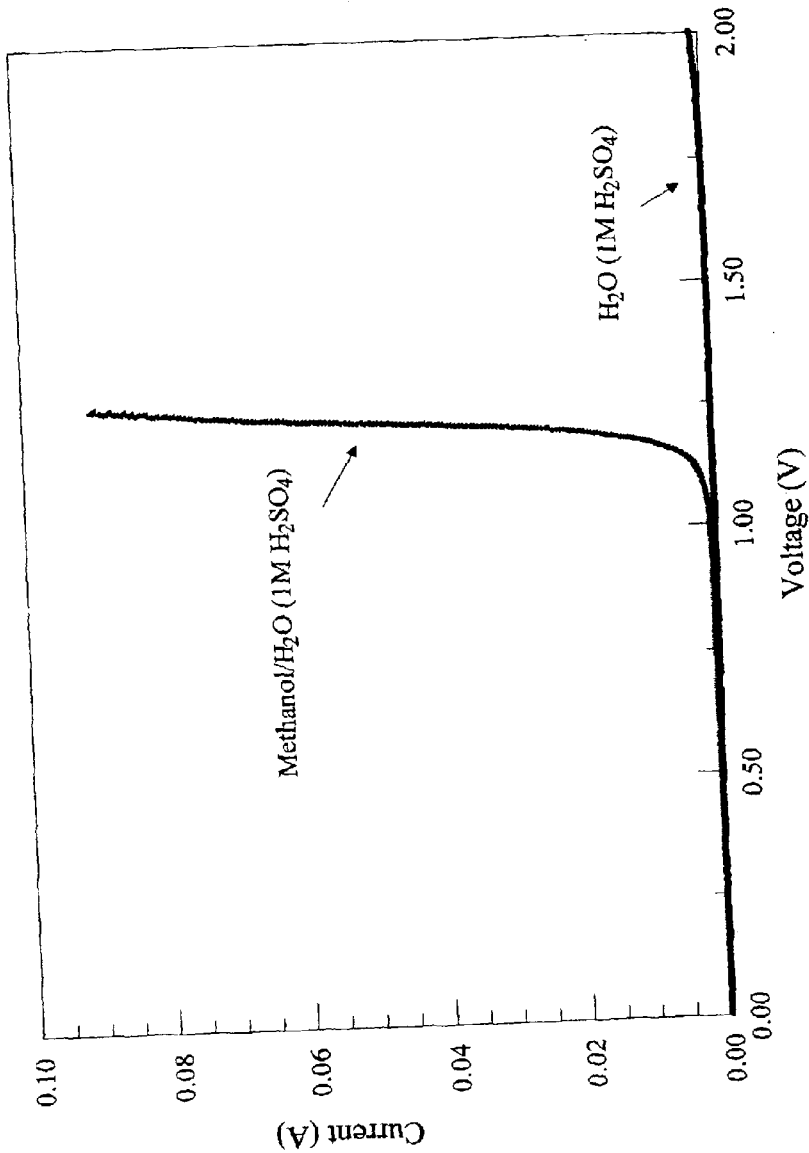
FIG. 1. Current as a function of voltage applied to electrochemical cells used to effect electrolysis of methanol in water in the presence of sulfuric acid and electrolysis of water in the presence of sulfuric acid.

The instant invention provides a method for efficiently producing hydrogen gas ($H_2$) from organic substances. The method of the instant invention subjects an organic substance to an electrolysis reaction in the presence of water in an acidic solution or in the presence of a base. The electrolysis reaction includes applying a potential to an electrochemical cell that contains the organic substance in order to effect a reaction that liberates hydrogen gas. An advantage of the instant invention is that it permits the production of hydrogen at room temperature from readily available organic substances.

Conceptually, the production of hydrogen from water is an ideal method for obtaining hydrogen. The underlying reaction for the production of hydrogen from water is the following reaction (1):

$$H_2O_{(l)} \leftrightarrows H_{2(g)} + \tfrac{1}{2}O_{2(g)} \tag{1}$$

This reaction is a desirable approach for producing hydrogen because water is a widely available starting material and oxygen gas is an inert by-product. The drawback associated with the reaction is that it is not thermodynamically spontaneous at room temperatures and consequently does not proceed unless external energy is applied. The external energy may be provided in the form of heat or electrical potential. The practical difficulty in obtaining hydrogen from water is the high required energy expenditure. If energy in the form of heat is provided, the required temperatures are impractically high. Similarly, if electrical energy is provided, the required potentials are high and costly to maintain.

In order to appreciate the magnitude of the energy expenditure required to obtain hydrogen from water, we consider the water electrolysis reaction. In water electrolysis, energy in the form of electrical energy is applied to water in order to induce the production of hydrogen according to the foregoing reaction (1). When effected by an electrical potential, the foregoing reaction (1) may be referred to as a water electrolysis reaction. The water electrolysis reaction may be conducted in an electrochemical cell that includes an anode and a cathode where an oxidation reaction occurs at the anode and a reduction reaction occurs at the cathode. Water electrolysis may be conducted in the presence of an acid or a base.

In water electrolysis in the presence of an acid, the following reactions occur at the anode and cathode:

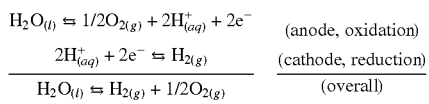

where $e^-$ denotes an electron. At 298 K with all species in their standard states (pure substance for liquids and solids, 1 M for dissolved species, and 1 atm pressure for gases), the half-cell potential of the anode reaction is $-1.23$ V and the half-cell potential of the cathode reaction is 0 V. (All half-cell potentials reported herein are relative to the normal hydrogen electrode.) The resulting total standard cell voltage $E_{cell}^0$ is the sum of the two half-cell potentials and is equal to $-1.23$ V. The negative total cell voltage indicates that the overall reaction does not occur spontaneously at 298 K and standard state conditions.

In water electrolysis in the presence of a base, the following reactions occur at the anode and cathode:

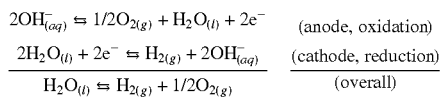

where $e^-$ denotes an electron. At 298 K with all species in their standard states (pure substance for liquids and solids, 1 M for dissolved species, and 1 atm pressure for gases), the half-cell potential of the anode reaction is $-0.40$ V and the half-cell potential of the cathode reaction is $-0.83$ V. The resulting total standard cell voltage $E_{cell}^0$ is the sum of the two half-cell potentials and is equal to $-1.23$ V. The negative total cell voltage indicates that the overall reaction does not occur spontaneously at 298 K and standard state conditions.

In order to effect the water electrolysis reaction in the presence of an acid or a base, a minimum external voltage in an amount equal to the total cell voltage is required. From the above analysis at standard state conditions, 1.23 V is the minimum voltage required to initiate the water electrolysis reaction in the presence of an acid or a base. In practice, it has been found that voltages of about 2.0 V are needed for either reaction to proceed at a reasonable rate. Since the required voltage is high, a significant and costly expenditure of electrical energy is needed to achieve water electrolysis at practical rates.

The foregoing analysis is predicated on a temperature of 298 K and standard state conditions. Changes in temperature, gas pressure etc. influence the minimum and practical voltages needed to run the water electrolysis reaction. Conditions corresponding to more favorable voltages may be found, but a more rigorous electrochemical analysis shows that reasonable variations in conditions have only a modest effect on the voltages and that conditions considered to be practical may still require high voltages.

While recognizing that water electrolysis is a feasible approach for producing hydrogen, the instant inventors wish to identify more cost-effective methods. In the co-pending parent U.S. patent application Ser. No. 09/929,940, the disclosure of which has been incorporated by reference hereinabove, the instant inventors considered the production of hydrogen from hydrocarbons and, preferably, oxygenated hydrocarbons. As in hydrogen production from water, the production of hydrogen from most hydrocarbons and many oxygenated hydrocarbons occurs through reactions that are not spontaneous at standard conditions. In these reactions, spontaneity is assessed through the Gibbs energy of reaction, rather than electrochemical cell voltage, where a negative Gibbs energy of reaction corresponds to a spontaneous reaction. Conventionally, hydrogen is produced from hydrocarbons through reformation reactions with water to form hydrogen gas along with carbon dioxide as a by-product. Since these reformation reactions have large and positive Gibbs energies of reaction, high temperatures are required to initiate them and even higher temperatures are required to achieve reasonable hydrogen production rates. The high temperatures provide reaction conditions at which the Gibbs energy of reaction becomes negative. Reformation of oxygenated hydrocarbons (e.g. methanol, ethanol, formic acid, formaldehyde etc.) with water to form hydrogen and carbon dioxide is also possible and frequently occurs through reactions having smaller Gibbs energies of reaction than those of hydrocarbon reformation reactions. In some reformation reactions of oxygenated hydrocarbons with water, small negative values of the Gibbs energy of reaction are observed and these reactions occur spontaneously, albeit slowly, at standard conditions.

In order to promote the reformation reactions of hydrocarbons and oxygenated hydrocarbons, the instant inventors in the co-pending, parent U.S. patent application Ser. No. 09/929,940 considered factors that may facilitate reformation reactions. The instant inventors recognize the need to identify reactions or conditions that lead to lower, and preferably negative, values of the Gibbs energy of reaction so that hydrogen production is promoted. Preferably, the Gibbs free energy of reaction should be negative at a temperature near or below room temperature in order to achieve efficient room temperature production of hydrogen.

The co-pending, parent U.S. patent application Ser. No. 09/929,940 by the instant inventors teaches the use of bases as a method for lowering the Gibbs energy of reaction of hydrogen producing reactions that utilize hydrocarbons or oxygenated hydrocarbons as starting materials. Specifically, the instant inventors applied a thermodynamic analysis and demonstrated that reactions of bases with many hydrocarbons or oxygenated hydrocarbons have lower Gibbs energies of reactions and occur at lower temperatures than conventional reformation processes using water and no base. Inclusion of a base leads to hydrogen production along with the bicarbonate ion ($HCO_3^-$) or carbonate ion ($CO_3^{2-}$) as by-products. Table 1 shows the extent to which the Gibbs energy of reaction decreases in the presence of a base for reactions that produce hydrogen from methanol.

TABLE 1

Gibbs Free Energy of Reaction ($\Delta G_{rxn}$) for Hydrogen
Producing Reactions of Methanol
(25° C., 1 atm. and unit activity of reactants and products)

| Reaction | $\Delta G_{rxn}$ (calories) |
| --- | --- |
| $CH_3OH + H_2O \leftrightharpoons 3H_2 + CO_2$ | 4,130 |
| $CH_3OH + OH^- + H_2O \leftrightharpoons 3H_2 + HCO_3^-$ | −4,325 |
| $CH_3OH + 2OH^- \leftrightharpoons 3H_2 + CO_3^{2-}$ | −9,330 |

The first reaction in Table 1 is the conventional reformation reaction of methanol with water. The other two reactions show the production of hydrogen from methanol in the presence of hydroxide ion provided by a base. The table indicates that the conventional reformation reaction is not spontaneous at the stated reaction conditions and that the addition of base leads to spontaneous reactions. The lowering of the Gibbs energy of reaction through the addition of base enables hydrogen production from methanol at room temperature. Alternatively, if temperatures above room temperature are used to enhance the rate of production of hydrogen, the data in the table indicate that inclusion of a base will provide more spontaneous reactions. In the co-pending, parent U.S. patent application Ser. No. 09/929,940, the instant inventors provided exemplary embodiments illustrating the expectations of Table 1 and showed that the production of hydrogen occurs more spontaneously or at a lower practical temperature relative to the conventional reformation reaction when a base is present. Similar results were demonstrated for several other hydrocarbons and oxygenated hydrocarbons.

In the instant invention, the instant inventors consider methods, other than or in addition to modifying the chemical environment through the addition of a base, which may promote the production of hydrogen. Even though, as described hereinabove, the water electrolysis reaction requires a high electrochemical cell voltage, the principle of using an electrochemical cell voltage to facilitate a chemical reaction is sound and is utilized in the instant invention. An objective of the instant invention is to identify reactions or conditions that produce hydrogen at a lower electrochemical cell potential than is required for the water electrolysis reaction.

In one embodiment, the instant invention provides electrochemical reactions of organic substances with water that require low electrochemical cell voltages at room temperature. In another embodiment, the instant invention provides electrochemical reactions of organic substances in the presence of an acid or base that require low electrochemical cell voltages at room temperature. In some embodiments, hydrogen production reactions of organic substances occur spontaneously at room temperature in an electrochemical reaction and are accelerated by heating. In other embodiments, hydrogen production reactions of organic substances occur spontaneously at room temperature without applying a voltage and are accelerated by providing a voltage.

In order to illustrate the principles and scope of the instant invention, the production of hydrogen from methanol in an electrochemical reaction is considered. Although the specific example of methanol is considered in the following discussion, this discussion is not intended to limit to scope of practice of the instant invention. The example of methanol is illustrative of, rather than limiting of, the full scope of the instant invention.

In one embodiment, hydrogen may be produced from an electrochemical reaction of methanol and water. This embodiment may be referred to as methanol electrolysis and is analogous to the water electrolysis reaction discussed hereinabove. The anode, cathode and overall reactions that occur in methanol electrolysis in the presence of an acid are given below:

$$\begin{array}{ll} CH_3OH_{(l)} + H_2O_{(l)} \leftrightharpoons CO_{2(g)} + 6H^+_{(aq)} + 6e^- & \text{(anode, oxidation)} \\ 6H^+_{(aq)} + 6e^- \leftrightharpoons 3H_{2(g)} & \text{(cathode, reduction)} \\ \hline CH_3OH_{(l)} + H_2O_{(l)} \leftrightharpoons CO_{2(g)} + 3H_{2(g)} & \text{(overall)} \end{array}$$

The cell potential of the reaction can be determined from the Gibbs energy change of the reaction using the equation $$E_{Cell} = -\frac{\Delta G}{nF}$$

or, at standard conditions, $$E^0_{cell} = -\frac{\Delta G^0}{nF}$$

where $E_{Cell}$ is the cell voltage, $\Delta G$ is the Gibbs energy of reaction, n is the number of electrons transferred, F is the Faraday constant

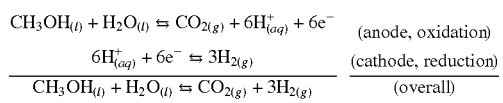

and the superscript$^0$ indicates standard conditions. The former equation is a general equation that may be used for arbitrary reaction conditions, while the latter equation applies to systems at 298 K and standard state conditions. The latter equation is commonly used because data for $\Delta G^0$ is typically reported in thermodynamic handbooks. Alternatively, $\Delta G^0$ may be computed from Gibbs energy of formation data for the compounds that participate in the reaction and this data is also typically reported at 298 K and standard state conditions. Once the value of the standard cell voltage $E_{Cell}^0$ is known, standard equations can be used to account for deviations of temperature, pressure, concentration etc. from 298 K and standard state conditions. Also, the above equations indicate that $\Delta G$ (or $\Delta G^0$) and $E_{Cell}$ (or $E_{Cell}^0$) have opposite signs. The condition for spontaneity of a reaction may therefore be expressed as a requirement for a negative value of $\Delta G$ or a positive value of $E_{Cell}$.

The standard cell voltage for the methanol and water electrolysis reactions, along with quantities used in the calculation thereof, are shown in Table 2 below:

TABLE 2

Comparison of the standard cell potential $E_{Cell}^0$ of the methanol electrolysis and water electrolysis reactions.

| Reaction | $\Delta G^0$ (kJ/mol) | n | $E_{Cell}^0$ (V) |
|---|---|---|---|
| $CH_3OH_{(l)} + H_2O_{(l)} \leftrightharpoons CO_{2(g)} + 3H_{2(g)}$ | 8.99 | 6 | −0.016 |
| $H_2O_{(l)} \leftrightharpoons H_{2(g)} + 1/2O_{2(g)}$ | 237.19 | 2 | −1.23 |

The data of Table 2 indicate that the standard cell potential of the methanol electrolysis reaction is much less negative than that of the water electrolysis reaction. The negative cell potential of the methanol electrolysis reaction indicates that this reaction does not proceed spontaneously, but the small magnitude of the cell potential indicates that only a small voltage is needed to effect the reaction. The voltage required to initiate a reaction may be defined as the external voltage required to increase the cell potential from a negative value to zero. Based on the data of Table 2, for example, a voltage of 0.016 V is needed to initiate the methanol electrolysis reaction at 298 K and standard state conditions. Voltages above 0.016 V both initiate and accelerate the methanol electrolysis reaction. Much higher voltages are needed to initiate and accelerate the water electrolysis reaction. Accordingly, the methanol electrolysis reaction produces hydrogen under more favorable conditions (e.g. lower operating voltages or lower operating temperatures) than the water electrolysis reaction.

Although the data of Table 2 are based on a temperature of 298 K and standard state conditions, the general result that the methanol electrolysis reaction lower voltages or lower temperatures to initiate or operate at a given rate. Stated alternatively, the methanol electrolysis reaction requires less external energy to become spontaneous than water electrolysis. The lower required external energy means that methanol electrolysis produces hydrogen with a lower expenditure of energy and that its conditions of operation are more cost effective for a given rate of hydrogen production.

In other embodiments of the instant invention, hydrogen is produced from an electrochemical reaction of methanol with a base. The base provides a hydroxide ion that is capable of reacting with methanol. In one embodiment, methanol reacts with one equivalent of hydroxide ion according to the following anode, cathode and overall reactions:

$CH_3OH_{(l)} + 7OH_{(aq)}^- \leftrightharpoons HCO_{3(aq)}^- + 5H_2O_{(l)} + 6e^-$ (anode, oxidation)
$6H_2O_{(l)} + 6e^- \leftrightharpoons 3H_{2(g)} + 6OH_{(aq)}^-$ (cathode, reduction)
$\overline{CH_3OH_{(l)} + OH_{(aq)}^- + H_2O_{(l)} \leftrightharpoons HCO_{3(aq)}^- + 3H_{2(g)}}$ (overall)

In this reaction, hydrogen gas is produced along with bicarbonate ion as a by-product. Methanol may also react with two equivalents of hydroxide ion to produce hydrogen gas along with carbonate ion as a by-product according to the following anode, cathode and overall reactions:

$CH_3OH_{(l)} + 8OH_{(aq)}^- \leftrightharpoons CO_{3(aq)}^{2-} + 6H_2O_{(l)} + 6e^-$ (anode, oxidation)
$6H_2O_{(l)} + 6e^- \leftrightharpoons 3H_{2(g)} + 6OH_{(aq)}^-$ (cathode, reduction)
$\overline{CH_3OH_{(l)} + 2OH_{(aq)}^- \leftrightharpoons CO_{3(aq)}^{2-} + 3H_{2(g)}}$ (overall)

The amount of base present in the reaction mixture is an important consideration in establishing whether methanol reacts primarily with one or two equivalents of hydroxide ion in the overall reaction. In principle, both reactions can occur simultaneously and in practice, the specific reaction conditions determine whether one overall reaction is more important than the other overall reaction. When small amounts of base are present, overall reaction of methanol with one equivalent of hydroxide is more likely than overall reaction of methanol with two equivalents of hydroxide. As the amount of base increases, however, overall reaction of methanol with two equivalents of hydroxide becomes increasingly more likely and eventually becomes controlling. The concentration of hydroxide ion is an important factor that dictates whether the overall reaction of methanol occurs primarily with one or two equivalents of hydroxide ion. Consequently, the initial pH of the reaction mixture provides an indication of whether methanol reacts primarily with one or two equivalents of hydroxide ion. Thermodynamic data shows that reaction of methanol with one equivalent of hydroxide ion is more likely when the pH of the initial reaction mixture is between about 6.4 and 10.3 and that reaction of methanol with two equivalents of hydroxide ion is controlling when the pH of the initial reaction mixture is above about 10.3. When the pH of the initial reaction mixture is below about 6.4, the reaction of methanol with water is controlling, but reactions of methanol with hydroxide ion may still occur.

The standard cell potentials of the reactions of methanol with one or two equivalents of hydroxide ion can be calculated using the method described hereinabove. The results of the calculation are shown in Table 3 below:

TABLE 3

Standard cell potential $E_{Cell}^0$ of reactions of methanol with one or two equivalents of hydroxide ion.

| Reaction | $\Delta G^0$ (kJ/mol) | n | $E_{Cell}^0$ (V) |
|---|---|---|---|
| $CH_3OH_{(l)} + OH_{(aq)}^- + H_2O_{(l)} \leftrightharpoons HCO_{3(aq)}^- + 3H_{2(g)}$ | −26.37 | 6 | 0.046 |
| $CH_3OH_{(l)} + 2OH_{(aq)}^- \leftrightharpoons CO_{3(aq)}^{2-} + 3H_{2(g)}$ | −47.3 | 6 | 0.082 |

Table 3 indicates that the reactions of methanol with one or two equivalents of hydroxide ion exhibit positive standard cell voltages. Both reactions therefore occur spontaneously at 298 K and standard conditions without the need to apply an external electrical potential or external heating. The application of an external electrical potential or external heating serves to increase the rate of production of hydrogen relative to standard conditions. The reactions of methanol with hydroxide ion may therefore provide high rates of hydrogen production at low voltages and/or at temperatures at or near room temperature.

The foregoing discussion of hydrogen production from methanol demonstrates that hydrogen may be produced under more favorable conditions from methanol than from water. The operating voltage or operating temperature required to obtain a given rate of hydrogen production is lower through reactions of methanol compared to reactions of water. Similarly, for a given operating voltage, operating temperature or combination thereof, the rate of hydrogen production from methanol is higher than the rate of hydrogen production from water.

In addition to methanol, hydrogen may be produced from a variety of organic substances using the instant invention. A preferred characteristic of organic substances suitable for the instant invention is that they be more readily oxidizable than water at a common temperature and corresponding reaction conditions. As used herein, oxidizability refers to the voltage required to initiate a hydrogen producing reaction of an organic substance. In the comparison of methanol electrolysis and water electrolysis discussed in Table 2 hereinabove, for example, initiation of water electrolysis required a voltage of 1.23 V at 298 K and standard conditions and initiation of methanol electrolysis required a voltage of 0.016 V at 298 K and standard conditions. Methanol is thus more oxidizable than water at 298 K and standard conditions. Oxidizability may be similarly defined for temperatures other than 298 K and for non-standard conditions. Pressure, concentration etc. may deviate from standard conditions. Oxidizability further extends to reactions of organic substances with bases where corresponding conditions implies corresponding amounts of base. Organic substances for which conditions can be found such that the organic substance is more oxidizable than water are within the scope of the instant invention. Specific systems include alcohols (methanol, ethanol, etc.), aldehydes (formaldehyde, acetaldehyde, etc.), carboxylic acids (formic acid, acetic acid, etc.), ketones (acetone, etc.), sugars and ethers (dimethyl ether, methyl ethyl ether, diethyl ether, etc.). These substances may produce hydrogen through reactions with water, water in the presence of an acid, water in the presence of a base and/or a base.

Bases suitable for use in the instant invention are compounds that provide hydroxide ions. Metal hydroxides are the preferred bases. Representative metal hydroxides include alkali metal hydroxides (e.g. NaOH, KOH etc.) alkaline earth metal hydroxides (e.g. $Ca(OH)_2$, $Mg(OH)_2$, etc.), transition metal hydroxides, post-transition metal hydroxides and rare earth hydroxides. Non-metal hydroxides such as ammonium hydroxide may also be used.

Methods of producing hydrogen according to the instant invention include combining an organic substance with water and applying a voltage. Other of the instant methods include combining an organic substance with a base and applying a voltage. In a typical experimental configuration, an electrolyte solution containing the organic substance along with water and/or a base is placed in an electrochemical cell that includes an anode and a cathode where a voltage is applied between the anode and cathode to induce or accelerate an electrochemical reaction. A reference or counterelectrode may also be present. The electrodes known in the art are suitable for use in the instant invention. Representative electrodes include those based on carbon, nickel, platinum, transition metals, metal alloys, and hydrogen storage materials. The electrochemical cell may optionally be heated. It is desirable for the voltage applied to be as small as possible so that the energy expenditure is minimized. In a preferred embodiment, the magnitude of the voltage applied is less than 1.0 V. In a more preferred embodiment, the magnitude of the voltage applied is less than 0.5 V. In a most preferred embodiment, the magnitude of the voltage applied is less than 0.25 V.

In the methods of the instant invention, a conductivity-enhancing agent may also be included in the electrolyte in order to improve conductivity and enhance electrochemical activity. A conductivity-enhancing agent may be useful when the ionizability of the organic substance is low and no other readily ionizable species is present. Ionizability is a measure of a substance's ability to dissociate into ions in solution. Since ions are the preferred charge carriers in an electrolytic solution, it is desirable to have a sufficient number of ions available to insure adequate conductivity to complete an electrochemical reaction. Since most organic substances exhibit low ionizability, electrochemical reactions of organic substances typically require the presence of an ionizable compound in the electrolyte solution. The conductivity-enhancing agent may or may not participate in the electrochemical reaction. In the instant reactions of organic substances with bases, for example, the base may function as both a reactant and a conductivity-enhancing agent since many hydroxide bases ionize to a high degree in solution. In the instant reactions of organic substances with water in the absence of a base, it is preferable to include a non-participating conductivity-enhancing agent because water does not appreciably dissociate into ions. Conductivity-enhancing agents are generally ionic substances that readily dissociate into ions in solution. Examples of conductivity-enhancing agents include salts, acids and bases.

In selecting a conductivity-enhancing agent, it is important that it or the ions formed from it do not interfere with or impede the electrochemical reaction used to produce hydrogen. The conductivity-enhancing agent or ions obtained upon its dissociation may represent species that oxidize at the anode or reduce at the cathode of the electrochemical cell. These reactions may compete with or dominate the anode or cathode reactions needed to produce hydrogen, thereby impeding or preventing hydrogen formation. These competing reactions may also produce unwanted by-products. Unless the conductivity-enhancing agent is a reactant in the hydrogen producing reactant, it is preferable that it does not undergo substantial oxidation or reduction, but rather acts only to facilitate conductivity in the electrochemical cell.

The instant inventors have completed several experiments that demonstrate the production of hydrogen from organic substances in an electrochemical cell. Representative specific experiments are described hereinbelow.

EXAMPLE 1

In this example, one embodiment of methanol electrolysis according to the instant invention is described. The reaction was completed at room temperature in a testing electrochemical cell that included an anode, a cathode, and an electrolyte solution assembled within a 250 mL beaker. The anode included 20% Pt supported on high surface area carbon on a Toray paper substrate. The geometric area of the electrode was 4.1 cm². The cathode was identical in design to the anode. The anode and cathode were separated by 5.5 cm in the testing electrochemical cell. The electrolyte solution consisted of 50 mL methanol and 50 mL of a 1M aqueous solution of sulfuric acid. The sulfuric acid is present as a conductivity-enhancing agent and is present at constant concentration during the course of the methanol electrolysis reaction.

For comparison purposes, an analogous electrochemical cell without methanol was constructed. The electrolyte in the comparison cell consisted of 100 mL of a 1M aqueous solution of sulfuric acid. Except for the electrolyte, the comparison electrochemical cell was identical to the one used for methanol electrolysis. In the comparison cell, the electrochemical reaction is water electrolysis in the presence of sulfuric acid.

Once assembled, the testing and comparison electrochemical cells were tested for electrochemical activity at room temperature. The test protocol consisted of applying a voltage from an external source and measuring the current produced by the electrochemical reaction. When no reaction occurs, no current flows through the electrochemical cell. If the voltage is sufficient to initiate a reaction, a current develops in the cell. The greater the magnitude of the current, the greater the rate of reaction and the greater the rate of hydrogen production.

The test results are provided in FIG. 1 herein which shows a plot of the current that develops in the electrochemical cell as a function of the voltage applied by an external source. The curve labeled "$H_2O(1M\ H_2SO_4)$" is the result obtained for the water electrolysis reaction conducted in the comparison cell and the curve labeled "Methanol/$H_2O(1M\ H_2SO_4)$" is the result obtained for the methanol electrolysis reaction conducted in the testing cell. The results for the methanol electrolysis reaction have been corrected for the Ohmic resistance of the testing cell. The results for the water electrolysis reaction have not been corrected for the Ohmic resistance of the comparison cell.

The results for the water electrolysis reaction show that current is not produced in the comparison cell until the voltage is increased to about 1.9 V. Absence of a current below about 1.9 V indicates that the water electrolysis reaction does not occur at those voltages. Initiation of the reaction occurs at about 1.9 V and acceleration of the reaction occurs upon further increasing the voltage above about 1.9 V. These results indicate that voltage at or above 1.9 V are needed to produce hydrogen from the water electrolysis reaction in the comparison cell.

The results for the methanol electrolysis reaction show that the methanol electrolysis reaction is initiated at a voltage below 1.0 V and rapidly accelerates at voltages above about 1.1 V. These results indicate that appreciable rates of hydrogen production occur in the methanol electrolysis reaction conducted in the testing cell at voltages near and above 1.0 V.

This example shows that hydrogen production from methanol electrolysis occurs at lower voltages than hydrogen production from water electrolysis.

EXAMPLE 2

In this example, production of hydrogen from the electrolysis reaction of methanol in the presence of a base is demonstrated. The reaction was completed in a testing electrochemical cell that included an anode, a cathode, and an electrolyte solution assembled within a 100 mL beaker. The anode included 20% Pt supported on high surface area carbon on a silver plated nickel substrate. The geometric area of the electrode was 2 cm². The cathode was identical in design to the anode. The anode and cathode were separated by 1 cm in the testing electrochemical cell. The electrolyte solution consisted of 40 mL methanol, 20 mL water, and 60 g KOH. The KOH dissolved in the solution to provide hydroxide ion. The KOH was used as received from the vendor and may include adsorbed or hydrated water.

For comparison purposes, an analogous electrochemical cell without methanol was constructed. The electrolyte in the comparison cell consisted of 40 mL $H_2O$ and 120 g KOH. The KOH dissolved in the water to provide hydroxide ion. Except for the electrolyte, the comparison electrochemical cell was identical to the one used for the reaction of methanol with KOH. In the comparison cell, the electrochemical reaction is the electrolysis of water in the presence of KOH.

Once assembled, the testing and comparison electrochemical cells were tested for electrochemical activity at 60° C. The test protocol consisted of applying a voltage from an external source and measuring the current produced by the electrochemical reaction. When no reaction occurs, no current flows through the electrochemical cell. If the voltage is sufficient to initiate a reaction, a current develops in the cell. The greater the magnitude of the current, the greater the rate of reaction and the greater the rate of hydrogen production.

Figure 2:
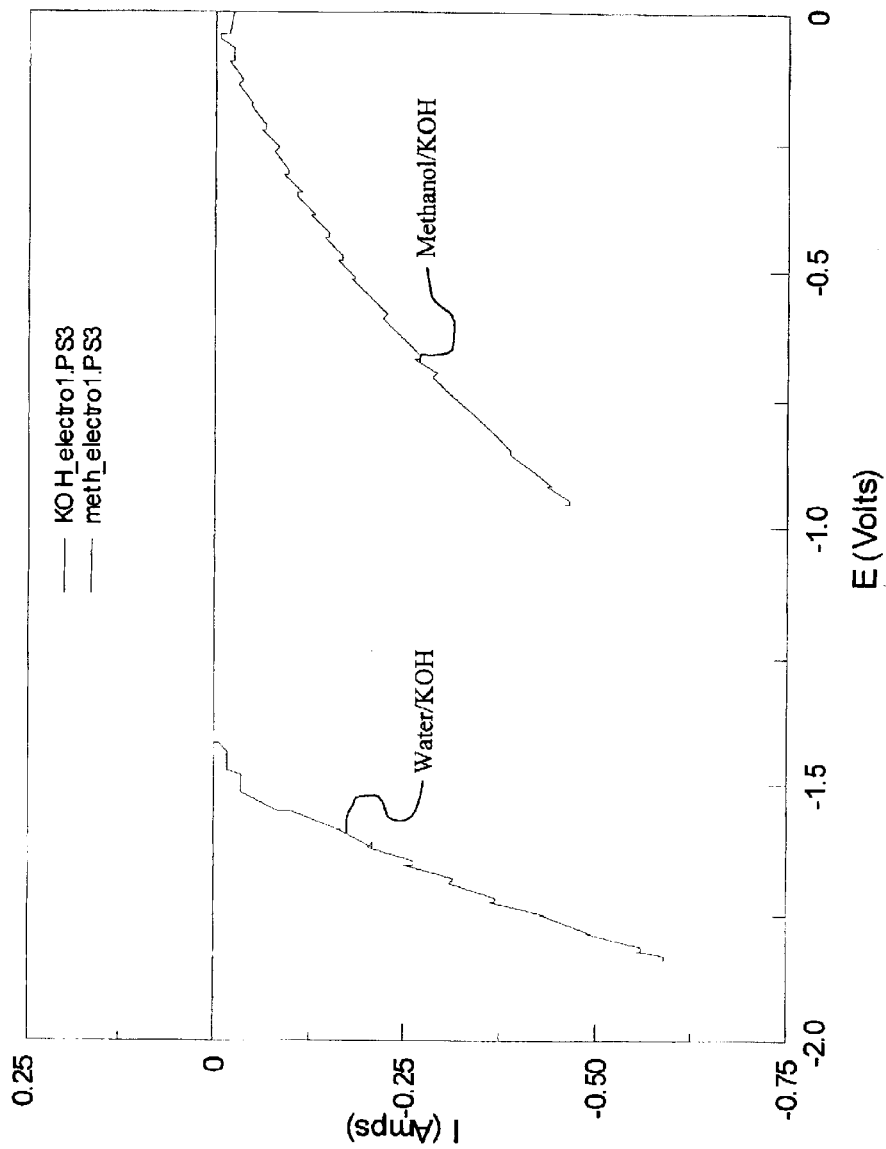
FIG. 2. Current as a function of voltage applied to electrochemical cells used to effect electrolysis of methanol in water in the presence of potassium hydroxide and electrolysis of water in the presence of potassium hydroxide.

The test results are provided in FIG. 2 herein which shows a plot of the current that develops in the electrochemical cell as a function of the voltage applied by an external source. The curve labeled "Water/KOH" is the result obtained for the electrolysis reaction of water in the presence of KOH conducted in the comparison cell and the curve labeled "Methanol/KOH" is the result obtained for the electrolysis reaction of methanol in the presence of KOH conducted in the testing cell. The results for the electrolysis reaction of methanol in the presence of KOH have not been corrected for the Ohmic resistance of the testing cell. The results for the electrolysis reaction of water in the presence of KOH have not been corrected for the Ohmic resistance of the comparison cell.

The results for the electrolysis reaction of water in the presence of KOH show that current is not produced in the comparison cell until the magnitude of the voltage is increased to about 1.4 V. Absence of a current at voltage magnitudes below about 1.4 V indicates that the water electrolysis reaction does not occur at those voltages. Initiation of the reaction occurs at a voltage magnitude of about 1.4 V and acceleration of the reaction occurs upon further increasing the voltage magnitude above about 1.4 V. These results indicate that voltage magnitudes at or above 1.4 V are needed to produce hydrogen from the electrolysis reaction of water in the presence of KOH conducted in the comparison cell.

The results for the electrolysis reaction of methanol in the presence of KOH show that the reaction already takes place at zero voltage conditions. In other words, the electrolysis reaction of methanol in the presence of KOH occurs spontaneously in the absence of an applied voltage. The results further indicate that application of a voltage acts to accelerate the reaction. These results indicate that appreciable rates of hydrogen production occur in the electrolysis reaction of methanol in the presence of KOH conducted in the testing cell at voltage magnitudes at or above 0 V.

This example shows that hydrogen production from the electrolysis reaction of methanol in the presence of KOH occurs at substantially lower voltages than hydrogen production from the electrolysis reaction of water in the presence of KOH.

EXAMPLE 3

In this example, the production of hydrogen from methanol and water in the presence of KOH at 23° C. and 60° C. is demonstrated. The reaction at each temperature was completed in a testing electrochemical cell that included an anode, a cathode, and an electrolyte solution assembled within a 250 mL beaker. The anode included 20% Pt supported on a Toray paper substrate. The geometric area of the electrode was 4.1 $cm^2$. The cathode was identical in design to the anode. The anode and cathode were separated by 5.5 cm in the testing electrochemical cell. The electrolyte solution consisted of a 100 mL portion of a solution formed by combining 250 mL methanol, 125 mL water, and 250 g KOH in a separate beaker. The KOH dissolved in the solution to provide hydroxide ion. The concentration of KOH in the electrolyte, expressed in molarity, is 9 M. The KOH was used as received from the vendor and may include adsorbed or hydrated water.

For comparison purposes, an analogous electrochemical cell without methanol was constructed. The electrolyte in the comparison cell consisted of a 100 mL portion of a solution formed by combining 225 mL $H_2O$ and 250 g KOH. The KOH dissolved in the water to provide hydroxide ion. The concentration of KOH in the electrolyte, expressed in molarity, is 12 M. Except for the electrolyte, the comparison electrochemical cell was identical to the one used for the reaction of methanol with KOH in the testing electrochemical cell. In the comparison cell, the electrochemical reaction is the electrolysis of water in the presence of KOH.

Once assembled, the testing and comparison electrochemical cells were tested for electrochemical activity at 23° C. and 60° C. The test protocol consisted of applying a voltage from an external source and measuring the current produced by the electrochemical reaction. When no reaction occurs, no current flows through the electrochemical cell. If the voltage is sufficient to initiate a reaction, a current develops in the cell. The greater the magnitude of the current, the greater the rate of reaction and the greater the rate of hydrogen production.

Figure 3:
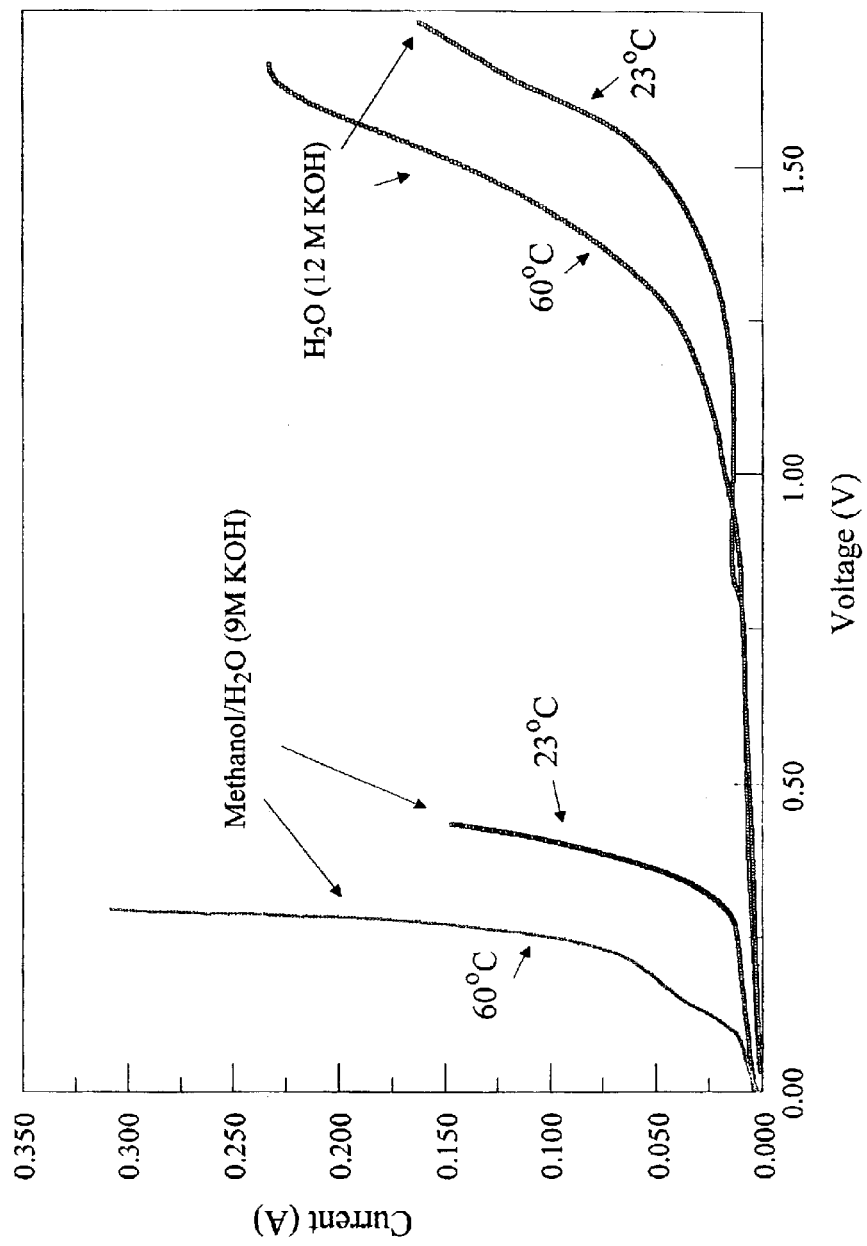
FIG. 3. Current as a function of voltage applied to electrochemical cells used to effect electrolysis of methanol in water in the presence of potassium hydroxide (9 M) and electrolysis of water in the presence of potassium hydroxide (12 M) at 23° C. and 60° C.

The results obtained for the testing and comparison cells are provided in FIG. 3 herein which shows a plot of the current that develops in each electrochemical cell as a function of the voltage applied by an external source. Curves are shown at 23° C. and 60° C. for each cell. The curves labeled "Methanol/$H_2O$" is the result obtained for the electrolysis reaction of the testing electrochemical cell (production of hydrogen from methanol and water in the presence of KOH) and the curve labeled "$H_2O$" is the result obtained for the electrolysis reaction of the comparison electrochemical cell (production of hydrogen from water in the presence of KOH). The results shown in FIG. 3 have been corrected for the Ohmic resistance of the testing cell and comparison cell.

The results for the production of hydrogen from water in the presence of KOH show that current is not produced in the comparison cell until the magnitude of the voltage is increased to about 1.4 V at 23° C. and about 1.25 V at 60° C. Absence of a current at voltage magnitudes below about 1.4 V and 1.25 V indicates that the water electrolysis reaction does not occur at those voltages at 23° C. and 60° C., respectively. Initiation of the reaction occurs at a voltage magnitude of about 1.4 V at 23° C. and about 1.25 V at 60° C. and acceleration of the reaction occurs upon further increasing the voltage magnitude above those voltages at each temperature, respectively. These results indicate that voltage magnitudes at or above 1.4 V at 23° C. and at or above 1.25 V at 60° C. are needed to produce hydrogen from the electrolysis reaction of water in the presence of KOH conducted in the comparison cell.

The results for the electrolysis reaction of methanol and water in the presence of KOH in the testing electrochemical cell show that the reaction already takes place at zero voltage conditions at 23° C. and 60° C. In other words, the electrolysis reaction of methanol in the presence of KOH occurs spontaneously in the absence of an applied voltage at both temperatures. The results further indicate that application of a voltage acts to accelerate the reaction. These results indicate that appreciable rates of hydrogen production occur in the electrolysis reaction of methanol and water in the presence of KOH conducted in the testing cell at voltage magnitudes at or above 0 V at both temperatures. A rapid increase in the rate of production of hydrogen is observed above about 0.1 V and 0.3 V at 60° C. and 23° C., respectively.

This example shows that hydrogen production from the electrolysis reaction of methanol and water in the presence of KOH occurs at substantially lower voltages than hydrogen production from the electrolysis reaction of water in the presence of KOH at 23° C. and 60° C. This example also shows that an increase in temperature promotes both hydrogen production reactions.

EXAMPLE 4

In this example, the production of hydrogen from methanol in the presence of KOH with no intentional inclusion of water is demonstrated. The reaction was completed in an electrochemical cell that included an anode, a cathode, and an electrolyte solution assembled within a 250 mL beaker. The anode included 20% Pt supported on a Toray paper substrate. The geometric area of the electrode was 4.1 $cm^2$. The cathode was identical in design to the anode. The anode and cathode were separated by 5.5 cm in the electrochemical cell. The electrolyte solution consisted of a 100 mL portion of a solution formed by combining 250 mL methanol and 90 g KOH in a separate beaker. The KOH dissolved in the solution to provide hydroxide ion. The concentration of KOH in the electrolyte, expressed in molarity, is 6.4 M. The KOH was used as received from the vendor and may include adsorbed or hydrated water. No water, other than any unintentional water accompanying the KOH, was intentionally included in the electrolyte solution.

Once assembled, the electrochemical cell was tested for electrochemical activity at 38° C. and 60° C. The test protocol consisted of applying a voltage from an external source and measuring the current produced by the electrochemical reaction. When no reaction occurs, no current flows through the electrochemical cell. If the voltage is sufficient to initiate a reaction, a current develops in the cell. The greater the magnitude of the current, the greater the rate of reaction and the greater the rate of hydrogen production.

Figure 4:
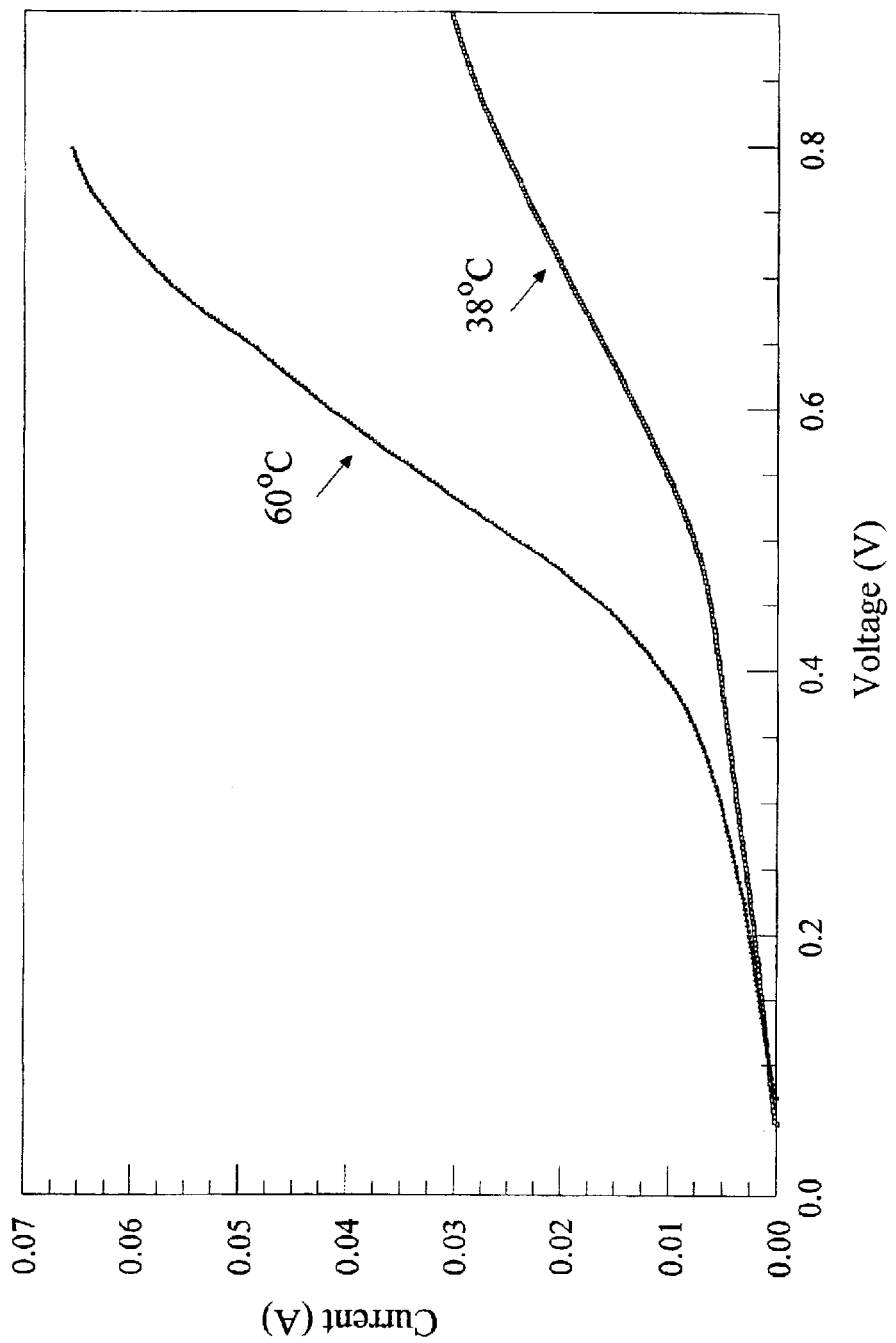
FIG. 4. Current as a function of voltage applied to electrochemical cells used to effect electrolysis of methanol in the presence of potassium hydroxide (6.4 M) without intentional inclusion of water at 38° C. and 60° C.

The results obtained for the electrochemical cell is provided in FIG. 4 herein which shows a plot of the current that develops in the electrochemical cell as a function of the voltage applied by an external source. Curves are shown at 38° C. and 60° C. The results shown in FIG. 4 have been corrected for the Ohmic resistance of the testing cell and comparison cell. The results show that the production of hydrogen from methanol in the presence of a base without the intentional inclusion of water in the electrolyte solution occurs at a voltage of less than 0.1 V at both temperatures. As the voltage is increased above 0.1 V, the hydrogen production reaction accelerates. Especially pronounced increases in the hydrogen production rate occur above about 0.45 V and about 0.35 V at 38° C. and 60° C., respectively.

This example shows that hydrogen production occurs through the electrolysis of methanol in the presence of KOH without the intentional inclusion of water in the electrolyte solution.

The examples and disclosure set forth hereinabove show that production of hydrogen from organic substances occurs through electrochemical reactions of organic substances in the presence of water, acid and base. The examples and disclosure set forth hereinabove also shows that the production of hydrogen from water occurs through electrochemical reactions of water in the presence of base. Bases in reactions with water or organic substances may be present at concentrations ranging from zero (e.g. reaction of methanol with water in the presence of an acid) to intermediate (e.g. reaction of methanol with KOH where KOH is present at a concentration of 6.4 M) to high (e.g. reaction of methanol and water with KOH where KOH is present at a concentration of 9 M or reaction of water with KOH where KOH is present at a concentration of 12 M). It is to be appreciated by persons in the art that other concentrations of base such as, but not limited to, 1 M, 3 M, 6 M etc. are also operative within the scope of the instant invention. Electrolyte solutions including base concentrations ranging continuously from nearly zero up to the solubility limit of the base in the electrolyte solution are among the embodiments of the instant invention. As described hereinabove, the concentration of base included in the electrolyte solution may influence the number of equivalents of hydroxide ion that react with an organic substance as well as the by-products produced in a hydrogen production reaction of an organic substance with a base.

The disclosure and discussion set forth herein is illustrative and not intended to limit the practice of the instant invention. Numerous equivalents and variations thereof are envisioned to be within the scope of the instant invention. It is the following claims, including all equivalents, in combination with the foregoing disclosure, which define the scope of the instant invention.

We claim:

1. A method for producing hydrogen gas comprising the steps of:
    providing an electrolyte solution, said electrolyte solution including an organic substance and a metal hydroxide base, said organic substance comprising carbon;
    placing said electrolyte solution in an electrochemical cell, said electrochemical cell including an anode and a cathode; and
    providing a voltage between said anode and said cathode, said voltage inducing an electrochemical reaction in said electrochemical cell,
    wherein said electrochemical reaction produces hydrogen gas.

2. The method of claim 1, wherein said organic substance further comprises oxygen.

3. The method of claim 1, wherein said organic substance is an alcohol.

4. The method of claim 3, wherein said alcohol is methanol.

5. The method of claim 3, wherein said alcohol is ethanol.

6. The method of claim 1, wherein said organic substance is an aldehyde or a carboxylic acid.

7. The method of claim 1, wherein said organic substance is a hydrocarbon.

8. The method of claim 1, wherein said organic substance is an ether or a ketone.

9. The method of claim 1, wherein said electrolyte solution further includes water.

10. The method of claim 1, wherein said electrolyte solution further includes a conductivity-enhancing agent.

11. The method of claim 1, wherein said metal hydroxide base is an alkali or alkaline earth metal hydroxide.

12. The method of claim 1, wherein the concentration of said metal hydroxide base in said electrolyte solution is at least 1 M.

13. The method of claim 1, wherein the concentration of said metal hydroxide base in said electrolyte solution is at least 3 M.

14. The method of claim 1, wherein the concentration of said metal hydroxide base in said electrolyte solution is at least 6 M.

15. The method of claim 1, wherein the concentration of said metal hydroxide base in said electrolyte solution is at least 9 M.

16. The method of claim 1, wherein the concentration of said metal hydroxide base in said electrolyte solution is at least 12 M.

17. The method of claim 1, wherein said electrolyte solution consists essentially of said organic substance and said metal hydroxide base.

18. The method of claim 1, wherein said anode or said cathode includes a hydrogen storage alloy.

19. The method of claim 1, wherein the magnitude of said voltage is less than 1.0 V.

20. The method of claim 1, wherein the magnitude of said voltage is less than 0.5 V.

21. The method of claim 1, wherein the magnitude of said voltage is less than 0.25 V.

22. The method of claim 1, wherein said electrochemical cell is heated to a temperature above room temperature.

23. A method for producing hydrogen gas comprising the steps of:

provid ing an electrolyte solution, said electrolyte solution including an organic substance, said organic substance comprising carbon;

placing said electrolyte solution in an electrochemical cell, said electrochemical cell including an anode and a cathode; and providing a voltage between said anode and said cathode, said voltage inducing an electrochemical reaction in said electrochemical cell, wherein said electrochemical reaction produces hydrogen gas and carbonate ion.

24. The method of claim 23, wherein said electrolyte solution further includes a base.

25. A method for producing hydrogen gas comprising the steps of:

providing an electrolyte solution, said electrolyte solution including an organic substance, said organic substance comprising carbon;

placing said electrolyte solution in an electrochemical cell, said electrochemical cell including an anode and a cathode; and providing a voltage between said anode and said cathode, said voltage inducing an electrochemical reaction in said electrochemical cell, wherein said electrochemical reaction produces hydrogen gas and bicarbonate ion.

26. The method of claim 25, wherein said electrolyte solution further includes a base.

27. A method for producing hydrogen gas comprising the steps of:

providing an electrolyte solution, said electrolyte solution including an organic substance, said organic substance comprising carbon;

placing said electrolyte solution in an electrochemical cell, said electrochemical cell including an anode and a cathode; and providing a voltage between said anode and said cathode, said voltage inducing an electrochemical reaction in said electrochemical cell, wherein said electrochemical reaction produces hydrogen gas without producing carbon dioxide.

28. The method of claim 27, wherein said electrolyte solution further includes a base.

29. The method of claim 27, wherein said electrolyte solution further includes an acid.

30. The method of claim 27, wherein said electrolyte solution further includes a conductivity-enhancing agent.

* * * * *